United States Patent
Buenaventura et al.

(10) Patent No.: US 10,877,453 B2
(45) Date of Patent: Dec. 29, 2020

(54) SYSTEMS AND METHODS FOR MONITORING A POWER-GENERATION MODULE ASSEMBLY AFTER A POWER-GENERATION MODULE SHUTDOWN EVENT

(71) Applicant: NuScale Power, LLC, Corvallis, OR (US)

(72) Inventors: Don Buenaventura, Seattle, WA (US); Doug Bowman, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 0 days.

(21) Appl. No.: 16/267,008

(22) Filed: Feb. 4, 2019

(65) Prior Publication Data

US 2020/0026252 A1    Jan. 23, 2020

Related U.S. Application Data

(63) Continuation of application No. 15/040,804, filed on Feb. 10, 2016, now abandoned.
(Continued)

(51) Int. Cl.
   *G05B 15/02*    (2006.01)
   *G05B 19/048*   (2006.01)
   *G05B 23/02*    (2006.01)

(52) U.S. Cl.
   CPC ........... *G05B 19/048* (2013.01); *G05B 15/02* (2013.01); *G05B 23/0267* (2013.01);
   (Continued)

(58) Field of Classification Search
   CPC ............................ G06F 3/04847; G05B 15/02
   (Continued)

(56) References Cited

U.S. PATENT DOCUMENTS 4,585,609 A    4/1986  Le
5,768,119 A    6/1998  Havekost
               (Continued)

FOREIGN PATENT DOCUMENTS

JP    H11149312    6/1999
JP    2002215227   7/2002
               (Continued)

OTHER PUBLICATIONS

Houser et al., "Overview of NuScale Testing Programs," 2 pages.
(Continued)

*Primary Examiner* — Muna A Techane
(74) *Attorney, Agent, or Firm* — Perkins Coie LLP

(57) ABSTRACT

Embodiments are directed to providing a user interface (UI) that streamlines and simplifies the process of monitoring critical power-generation module (PGM) parameters after a PGM assembly is shutdown. The UI displays, in real-time, indicators corresponding to one or more post-shutdown PGM parameters. The UI provides indications of whether the post-shutdown PGM parameters meet post-shutdown criteria of the PGM assembly. When a post-shutdown PGM parameter does not meet the post-shutdown criteria, a user alert is provided to the user. A protocol may additionally be provided to the user. In some embodiments, the protocol may enable the user to return the PGM assembly to a condition that satisfies the post-shutdown criteria. The protocol may be a safety protocol and/or an asset protection protocol.

20 Claims, 11 Drawing Sheets

Related U.S. Application Data

(60) Provisional application No. 62/205,084, filed on Aug. 14, 2015.

(52) U.S. Cl.
CPC .............. *G05B 2219/24015* (2013.01); *G05B 2219/2639* (2013.01); *Y04S 10/52* (2013.01)

(58) Field of Classification Search
USPC ........................................................ 700/292
See application file for complete search history.

(56) References Cited

U.S. PATENT DOCUMENTS

| | | | |
|---|---|---|---|
| 6,535,122 | B1 | 3/2003 | Bristol |
| 2008/0069290 | A1 | 3/2008 | Park et al. |
| 2009/0271504 | A1 | 10/2009 | Ginter |
| 2012/0036250 | A1 | 2/2012 | Vaswani |
| 2012/0219101 | A1 | 8/2012 | L'Abbate et al. |
| 2012/0271587 | A1 | 10/2012 | Shibuya et al. |
| 2013/0294560 | A1 | 11/2013 | Graham |
| 2014/0226780 | A1* | 8/2014 | Reyes, Jr. .............. G21C 11/08 376/289 |
| 2014/0376678 | A1 | 12/2014 | Leyse |
| 2016/0006066 | A1* | 1/2016 | Robertson .............. C25B 15/08 429/418 |
| 2016/0049210 | A1* | 2/2016 | Filippone ................ G21C 1/32 376/220 |

FOREIGN PATENT DOCUMENTS

| | | |
|---|---|---|
| JP | 2003114294 | 4/2003 |
| JP | 2009151398 | 7/2009 |
| JP | 2012073874 | 4/2012 |
| JP | 5416069 | 11/2013 |
| KR | 100798006 | 1/2008 |
| WO | WO9106960 | 5/1991 |
| WO | WO2005109126 | 11/2005 |
| WO | 2015085241 A1 | 6/2015 |

OTHER PUBLICATIONS

Ingersoll et al., "Can Nuclear Power and Renewables be Friends?" May 3-6, 2015, 9 pages.
Ingersoll et al., "Extending Nuclear Energy to Non-Electrical Applications," Aug. 24-28, 2014, 12 pages.
Ingersoll et al., "Integration of NuScale SMR with Desalination Technologies," Apr. 15-17, 2014, 8 pages.
Ingersoll et al., "NuScale Energy Supply for Oil Recovery and Refining Applications," Apr. 6-9, 2014, 8 pages.
Ingersoll et al., "NuScale Small Modular Reactor for Co-Generation of Electricity and Water," May 1, 2014, Desalination 340:84-93.
International Preliminary Report on Patentability in International Application No. PCT/US2016/024550, dated Feb. 20, 2018, 7 pages.
International Search Report and Written Opinion in International Application No. PCT/US2016/024550, dated Jun. 30, 2016, 9 pages.
NuScale Plant Design Overview, Sep. 16, 2013, 31 pages.
NuScale Power Module, NuScale Power, LLC.
Reyes, "NuScale Plant Safety in Response to Extreme Events," May 2012, Nuclear Technology, 178(2):153-163.
Authorized Officer Mineko Mohri, International Preliminary Report on Patentability and Written Opinion, International Application No. PCT/US2016/024558, dated Feb. 20, 2018, 9pgs.
Authorized Officer Myung Jin Lee, International Search Report, International Application No. PCT/US2016/024558, dated Jun. 27, 2016, 7 pages.
Extended European Search Report for European Patent Application No. 16837416.3, dated Mar. 13, 2019, pp. 7.
Extended European Search Report for European Patent Application No. 16837417.1, dated Mar. 13, 2019, pp. 7.

* cited by examiner

SYSTEMS AND METHODS FOR MONITORING A POWER-GENERATION MODULE ASSEMBLY AFTER A POWER-GENERATION MODULE SHUTDOWN EVENT

PRIORITY CLAIM

This patent application is a continuation of U.S. patent application Ser. No. 15/040,804, entitled SYSTEMS AND METHODS FOR MONITORING A POWER-GENERATION MODULE ASSEMBLY AFTER A POWER-GENERATION MODULE SHUTDOWN EVENT, filed on Feb. 10, 2016, which claims the priority of U.S. Provisional Patent Application Ser. No. 62/205,084, entitled SYSTEMS AND METHODS FOR THE MANAGEMENT OF OPERATOR NOTIFICATIONS AND POST-SHUTDOWN DISPLAYS FOR MODULAR FUSION-BASED POWER PLANTS, filed on Aug. 14, 2015, the contents of which are hereby incorporated by reference.

GOVERNMENT INTEREST

This invention was made with Government support under Contract No. DE-NE0000633 awarded by the Department of Energy. The Government has certain rights in this invention.

FIELD OF THE INVENTION

The application relates to a power-generation module and, more particularly but not exclusively to, monitoring one or more power-generation modules after a power-generation module shutdown event.

BACKGROUND OF THE INVENTION

After the operation of a nuclear reactor is shutdown, that is to say that the effective neutron multiplication factor of the core falls below criticality ($k_{eff}<1$), the core continues to generate at least heat and radioactivity. Furthermore, the core may continue to generate pressure within a containment vessel that houses the reactor, as well as within plumbing associated with reactor cooling and steam generation. Accordingly, it is critical to monitor the condition of a reactor reactor even when the reactor is in a subcritical state.

Monitoring a subcritical reactor requires the simultaneous and continuous monitoring of a large number of parameters. Furthermore, when the reactor is included in a power plant, the safety of various power plant assets that may be exposed to the deleterious effects of the residual heat, radioactivity, and pressure of the reactor must also be simultaneously and continuously monitored. Such monitoring requires a significant diligence from the reactor's operator. The demand for such operator diligence grows as the number of reactors included in a power plant multiplies. It is for these and other concerns that the following disclosure is provided.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
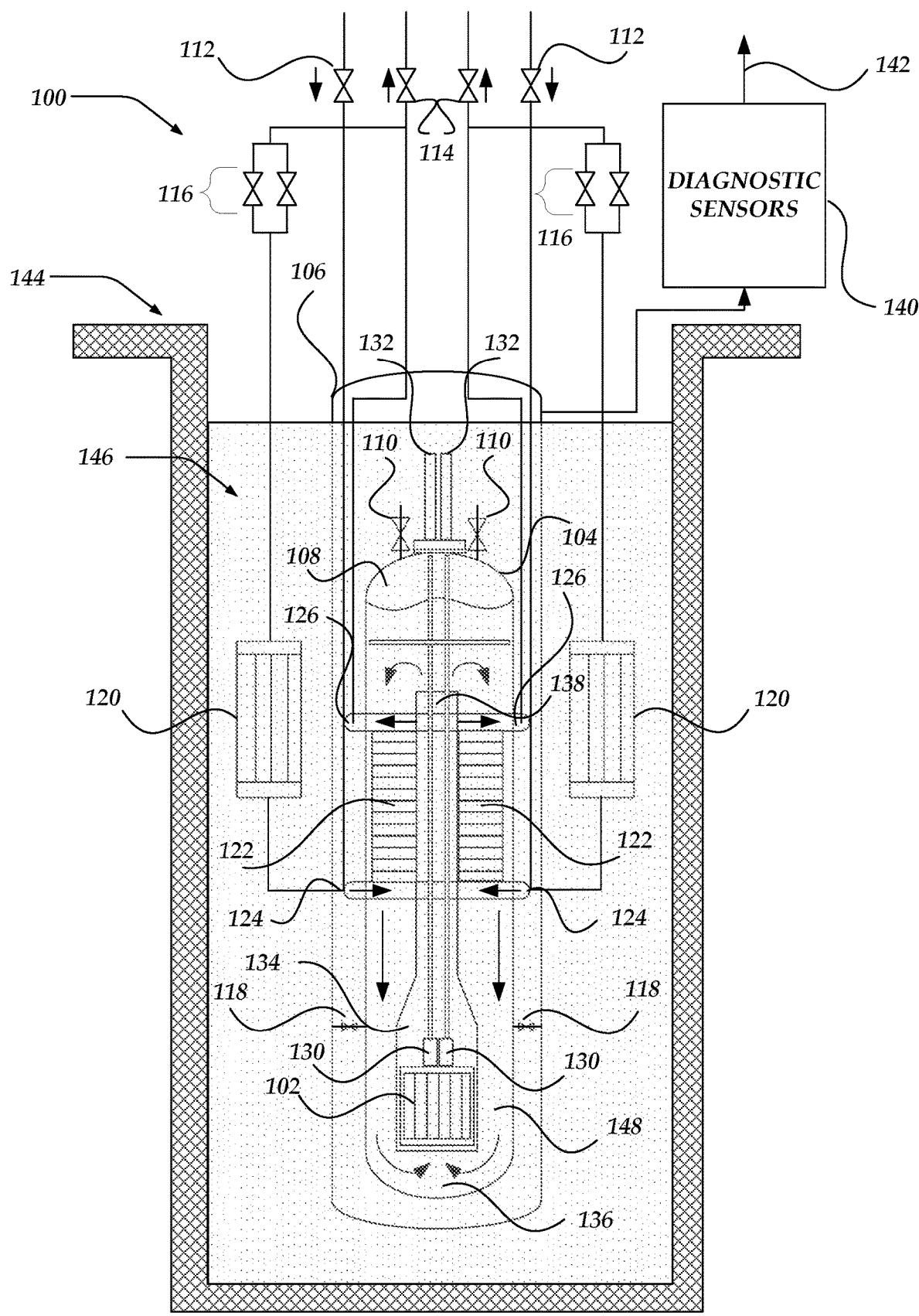
FIG. 1A provides a schematic view of a power-generation module assembly that is consistent with the various embodiments disclosed herein.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, embodiments are directed to monitoring a power-generation module (PGM) assembly after a PGM shutdown event. In some embodiments, the PGM assembly may include a nuclear reactor that has a reactor core that generates at least one of heat, pressure, or radioactivity. The PGM assembly may be included in a PGM assembly array included in a modular power plant, such as a modular nuclear power plant.

A human systems interface (HSI) is provided to a user or operator of the PGM assembly or the modular power plant. In various embodiments, the HSI may include one or more user interfaces (UIs). The one or more UIs may be provided to the user via one or more display devices of one or more computer devices.

The one or more UIs streamline and/or simplify the process of monitoring critical and/or non-critical PGM parameters after the PGM assembly shutdown event. Each UI may correspond to a specific PGM assembly included in the PGM assembly array. In various embodiments, each UI may be automatically provided on a specific display device that corresponds to the specific PGM assembly.

In some embodiments, the UIs may display in real-time, or near real-time, indicators corresponding to one or more post-shutdown PGM parameters. The UIs may provide indications of whether the one or more post-shutdown PGM parameters meet post-shutdown criteria. The post-shutdown criteria may include safety and/or asset protection criteria. Furthermore, one or more PGM parameter thresholds may be based on the post-shutdown criteria.

In at least one embodiment, when one or more post-shutdown PGM parameters do not meet the post-shutdown criteria, such as when the PGM parameters exceed and/or fall below the corresponding PGM parameter thresholds, one or more user alerts are provided to the user. The user alerts may be visual and/or audible user alerts. Upon an acknowledgment by the user, via a selection of a user selection within the UI, a protocol may be provided to the user. In some embodiments, the protocol may enable the user to return the PGM assembly to a condition that satisfies the post-shutdown criteria. The protocol may be a safety protocol and/or an asset protection protocol.

Illustrated Operating Environment

FIG. 1A provides a schematic view of a power-generation module (PGM) assembly 100 that is consistent with the various embodiments disclosed herein. In some embodiments, PGM assembly 100 is a modular nuclear reactor assembly, although other embodiments are not so constrained and PGM assembly 100 may be any modular assembly that generates flowing energy (heat). In some embodiments, PGM assembly 100 is a modular fission reactor assembly. In at least one embodiment, PGM assembly 100 is a modular fusion reactor assembly.

PGM assembly 100 may be housed in a PGM bay 144. The PGM bay 144 may include a cooling pool 146 of water or some other material that includes thermal properties enabling the cooling of PGM assembly 100. At least a portion of the PGM assembly 100 may be submerged in a cooling pool 146.

PGM assembly 100 includes PGM core 102. PGM core 102 may be any device, assembly, apparatus, or configuration that may be employed to controllably generate heat. In some embodiments, PGM core 102 may be a nuclear reactor core, such as but not limited to a fission reactor core. PGM core 102 may be immersed in PGM coolant 148. In at least one embodiment, PGM coolant 148 includes water or any other material that enables the flow of heat (generated by the PGM core 102) away from the PGM core 102.

In some embodiments, PGM assembly 100 includes a core shroud 134 that at least partially constrains, channels, or otherwise guides a flow of PGM coolant 148. As shown in FIG. 1A, PGM core 102 may be at least partially surrounded by the core shroud 134. The PGM core 102, the core shroud 134, and the PGM coolant 148 are housed within a pressure vessel 104.

In various embodiments, PGM core 102 generates heat that is transferred to the PGM coolant 148. As shown by the flow arrows in FIG. 1A, heating the PGM coolant 148 in the pressure vessel 104 generates a generally vertical circular convection current of the PGM coolant 148. The core shroud 148 at least partially constrains, channels, or otherwise guides the generally vertical circular convection current of the PGM coolant 148. A pressurizer 108 regulates the internal pressure within pressure vessel 104 that is due to at least the heating and/or the convection current of the PGM coolant 148.

The PGM core 102 heats the portion of the PGM coolant 148 that is in the lower plenum 136 of the core shroud 134. The heated PGM coolant 148 flows upward and out of the shroud riser 138. As the PGM coolant 148 flows upward, the heated PGM coolant 148 provides heat to a plurality of steam generators 122. Due at least this heat exchange, as the PGM coolant 148 flows out of the shroud riser 138, the PGM coolant 148 is cooled. As shown by the flow arrows in FIG. 1A, once outside of the shroud riser 138, the PGM coolant 148 flows generally downward between the core shroud 134 and the pressure vessel 104. The convection current pulls the cooled PGM coolant 148 near the lower plenum 136 back into the core shroud 134. The PGM core 102 reheats the PGM coolant 148 such that the convection current continues to circulate and cool the PGM core 102.

The pressure vessel 102 may be housed within a containment vessel 106. The containment vessel 106 may insure the containment of material within the pressure vessel 102, including any material included in the PGM core 102, as well as the PGM coolant 148. In some embodiments, the PGM assembly 100 includes a plurality of PGM vent valves 110 and/or a plurality of PGM recirculation valves 118 to vent pressure within and/or dissipate excess heat away from the pressure vessel 102.

Feedwater may flow in a circuit that includes the steam generators 122 and electrical generators (not shown in FIG. 1A). Within the steam generators 122, the feedwater is heated to generate stream. The generated steam flows out of the steam headers and carries the transferred heat away from PGM assembly 100. A plurality steam isolation valves regulate the flow of the steam away from the PGM assembly 100. The steam may be routed via a steam bus, such as but not limited to steam bus 160 of FIG. 1B, to electrical generators, such as but not limited to turbine generators, to generate electrical power or some other form of usable power.

After the energy within the steam generates the electrical power, the return of the cooled feedwater to the PGM assembly 100 may be regulated via a plurality of feedwater isolation valves 112. The cooled feedwater is returned to the steam generators 122 via the feedwater headers 124, to complete the circuit.

In at least some embodiments, even after a shutdown of the PGM assembly 100, the PGM core 102 may continue to generate heat. For instance, in embodiments where the PGM core 102 includes a nuclear reactor core, the nuclear reactor core may continue to generate heat during a decay period associated with the spent fuel within the nuclear reactor core. The heat that is generated after a shutdown of the PGM assembly 100 may be decay heat. Accordingly, to insure that the PGM core 102 and other components of the PGM assembly 100 do not overheat, at least due to decay heat, the power generated by the PGM core 102 may be dissipated.

To dissipate decay heat in some embodiments, the PGM assembly 100 includes a decay hear removal system (DHRS). The DHRS may include a plurality of DHRS heat exchangers 120 submerged in the cooling pool 146 of the PGM bay 144, as well as a plurality of a plurality of DHRS valves 116.

During a shutdown of the PGM assembly 100, or during another event where it is desired to not provide the steam and/or heated feedwater to the electrical generators, the plurality of steam isolation valves 114 may be closed such that the steam and/or heated feedwater does not flow to the electrical generators. Rather, the steam and/or heated feedwater flows through the plurality of DHRS heat exchangers 120 and is cooled. The DHRS heat exchangers 120 dump the excess heat into cooling pool 146. The circular flow of feedwater through the decay heat exchangers 120 may be regulated by the plurality of DHRS valves 116.

The rate of power generation of the of the PGM core 102 may be regulated by the positioning of one or more control rods 130. The positioning of the one or more control rods 130 may be driven by control rod drives 132.

PGM assembly 100 includes a plurality of diagnostic sensors 140 schematically shown in FIG. 1A. Diagnostic sensors 140 may sense and monitor various components of PGM module 100. Diagnostic sensors 140 may include various types of sensors, such as but not limited to temperature sensors, pressure sensors, valve configuration sensors control rod positioning sensors, radioactivity sensors, fluid and gas flow sensors, or any other sensor that monitors parameters of the PGM assembly 100. Diagnostic sensors 140 provide sensor output signals on a sensor data bus 142. Diagnostic sensors 140 may include safety sensors or safety-related sensors, as well as asset protection-related sensors.

Figure 1B:
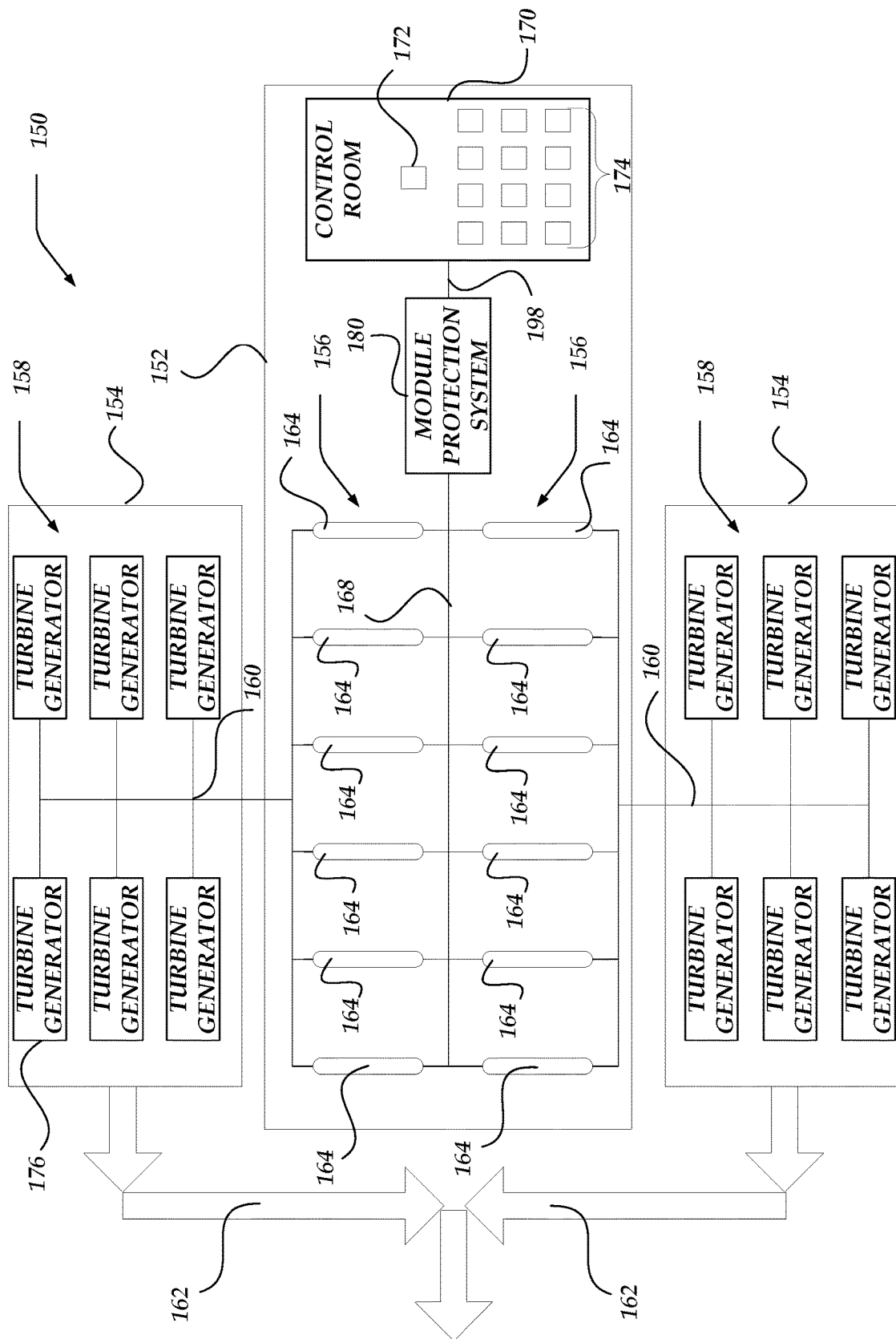
FIG. 1B provides a schematic view of a modular power plant that is consistent with the various embodiments disclosed herein.

FIG. 1B provides a schematic view of a modular power plant 150 that is consistent with the various embodiments disclosed herein. Modular power plant 150 includes power-generation module (PGM) assembly array 156. PGM assembly array 156 includes one or more PGM assemblies, such as but not limited to PGM assembly 164. In some embodiments, at least one of the PGM assemblies included in PGM assembly array 156 may include similar features to PGM assembly 100 of FIG. 1A. As shown in FIG. 1B, in at least one embodiment, PGM assembly array 156 includes twelve PGM assemblies. However, in other embodiments, the number of PGM assemblies included in PGM assembly array 156 includes more or less than twelve PGM assemblies. A PGM housing 152 may house at least a portion of the PGM assembly array 156.

In some embodiments, one or more generator housings 154 house a generator array 158. Generator array 158 includes one or more devices that generate electrical power or some other form of usable power from steam generated by the PGM assembly array 156. Accordingly, generator array 158 may include one or more electrical generators, such as but not limited to turbine generator 176. As shown in FIG. 1B, in at least one embodiment, generator array 158 includes twelve electrical generators. However, in other embodiments, the number of electrical generators included in generator array 158 includes more or less than electrical generators. In at least one embodiment, there is a one to one correspondence between each PGM assembly included PGM assembly array 156 and each electrical generator included in generator array 158.

A steam bus 160 may route the steam generated by PGM assembly array 156 to the generator array 158. The steam bus 160 may provide the one to one correspondence between the PGM assemblies included in the PGM assembly array 156 and the electrical generators included in the generator array 158. For instance, the steam bus 160 may insure that the steam generated by a particular PGM assembly is provided only to a particular electrical generator. The steam bus 160 may additionally insure that the steam provided to the particular electrical generator is generated only by the particular PGM assembly. A power bus 162 may transmit the electrical power generated by modular power plant 150 to other structures.

Modular power plant 150 may include a sensor data bus 168, a module protection system (MPS) 180, a module control system (MCS) network 198, and a control room 170. As shown in FIG. 1B, in at least some embodiments, the MPS 180 and the control room 170 are housed within PGM housing 152, although other embodiments are not so constrained.

Figure 1C:
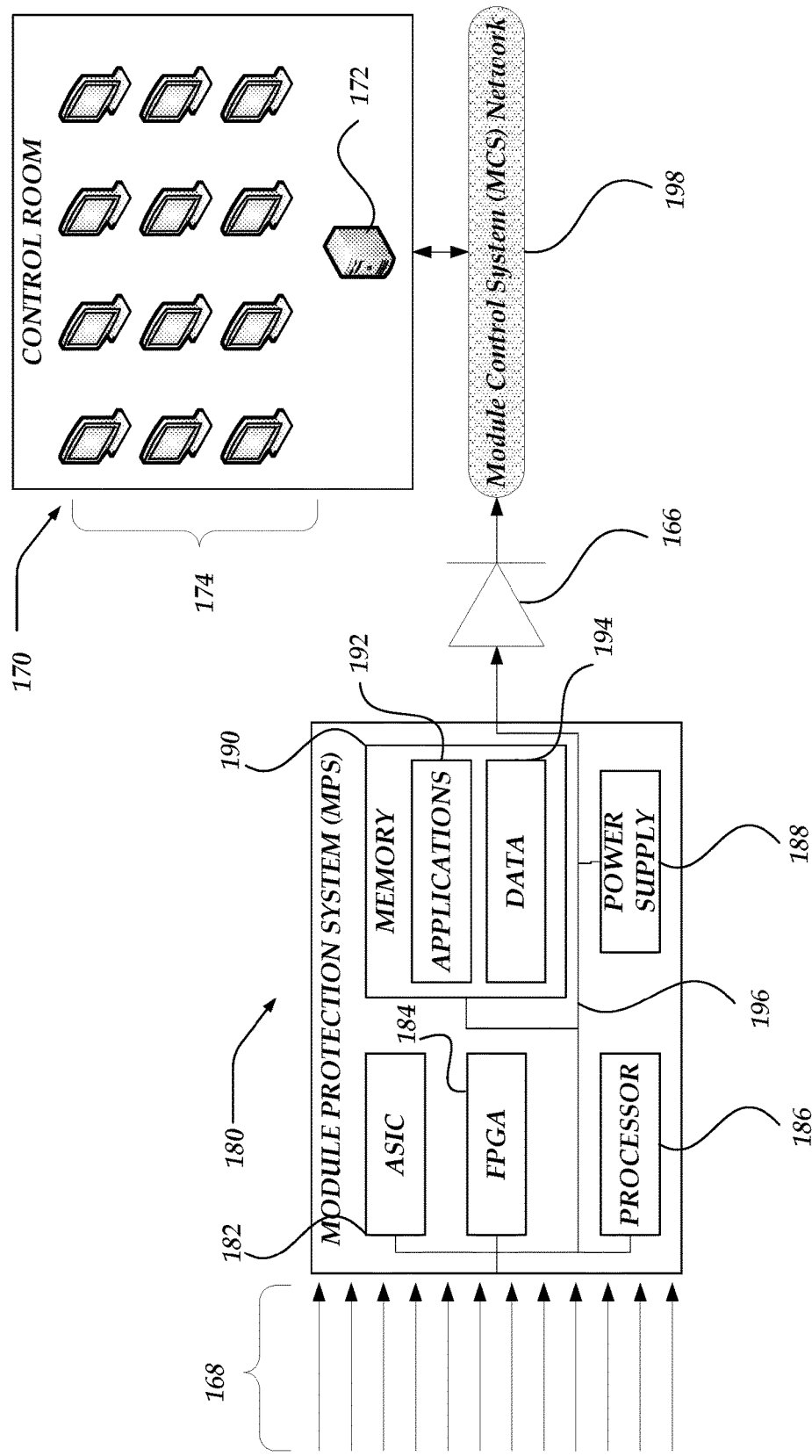
FIG. 1C provides a schematic view of sensor data bus, the modular protection system, the module control system network, and the control room of FIG. 1B.

FIG. 1C provides a schematic view of sensor data bus, the MPS 180, the MCS network 198, and the control room of FIG. 1B. A sensor data bus 168 may provide data generated by diagnostic sensors included in each PGM assembly include PGM assembly array 156 of FIG. 1B, such as but not limited to diagnostic sensors 140 of FIG. 1A, to MPS 180. As shown in FIG. 1C, in various embodiments, the sensor data bus 168 may provide at least one input, corresponding to each of the PGM assemblies included in PGM assembly array 156, to the MPS 180.

MPS 180 provides at least a portion of the diagnostic sensor data to control room 170 via a module control system (MCS) network 198. Accordingly, MPS 180 may be a modular protection data hub. MPS 180 provides protection for the integrity of the diagnostic sensor data. In various embodiments, MPS 180 includes at least one of a processor 186, logic circuitry, such as but not limited to application specific integrated circuits (ASIC) 182 and/or field programmable gate arrays (FPGA) 184, and a power supply 188. The various logic circuitry may include similar features to logic circuitry 268 discussed in conjunction with at least FIG. 2. Processor 186 that may include similar features to processor 202 and power supply 188 may include similar feature to power supply 230 discussed in at least conjunction with FIG. 2.

MPS may further include memory 190 to store various applications 192 and data 194, such as but not limited to the diagnostic sensor data provided by the sensor data bus 168. Memory 190 may include similar features to memory 204 discussed in conjunction with at least FIG. 2.

Control room 170 includes at least one computer device 172 and a display device array 174. Computer device 172 may be similar to, or at least include similar features to computer device 200 discussed in conjunction with at least FIG. 2. Display device array 174 includes one or more display devices. At least one of the display devices included in display device array 174 may be similar to, or at least include similar features to display 250 discussed in conjunction with at least FIG. 2.

As shown in FIG. 1B, in some embodiments, the display device array 174 includes twelve display devices. In at least one embodiment, there is a one to one correspondence between each of the PGM assemblies included in the PGM assembly array 156 and each of the display devices included in display device array 174. Accordingly, there may be more or less than twelve display devices included in display device 174.

A data diode 166 may protect the MPS 180 by enabling data to flow from the MPS 180 to the MCS 198, but prevent data flowing from MCS network 198 to MPS 180. Accordingly, one or more data busses upstream of data diode 166 may be protected from data signals from downstream of data diose 166, such as signals from MCS network 198. In some embodiments, data busses upstream of data diode 166 may include transport data that is critical to the safe operation of modular power plant 150, but at least a portion of the data transported by MCS network 198 is not critical to the safe operation of modular power plant 150.

Generalized Operations

The operation of certain aspects of the invention will now be described with respect to FIGS. 3-4C. In at least one of various embodiments, processes 300, 400, 420, and 440 described in conjunction with FIGS. 3-4C, respectively, or portions of these processes may be implemented by and/or executed on a computer device, such as but not limited to computer device 200 of FIG. 2. In other embodiments, these processes or portions of these processes may be implemented by and/or executed on a plurality of computer devices. Further, in other embodiments, these processes or portions of these processes may be implemented by and/or executed on one or more module protection systems (MPSs), such as MPS 180 as shown in FIG. 1C. In addition, in at least one of the various embodiments, these processes or portions of these processes may be implemented by and/or executed on one or more cloud instances operating in one or more cloud networks. However, embodiments are not so limited and various combinations of computer devices, MPSs, cloud computers, or the like, may be utilized.

Figure 5A:
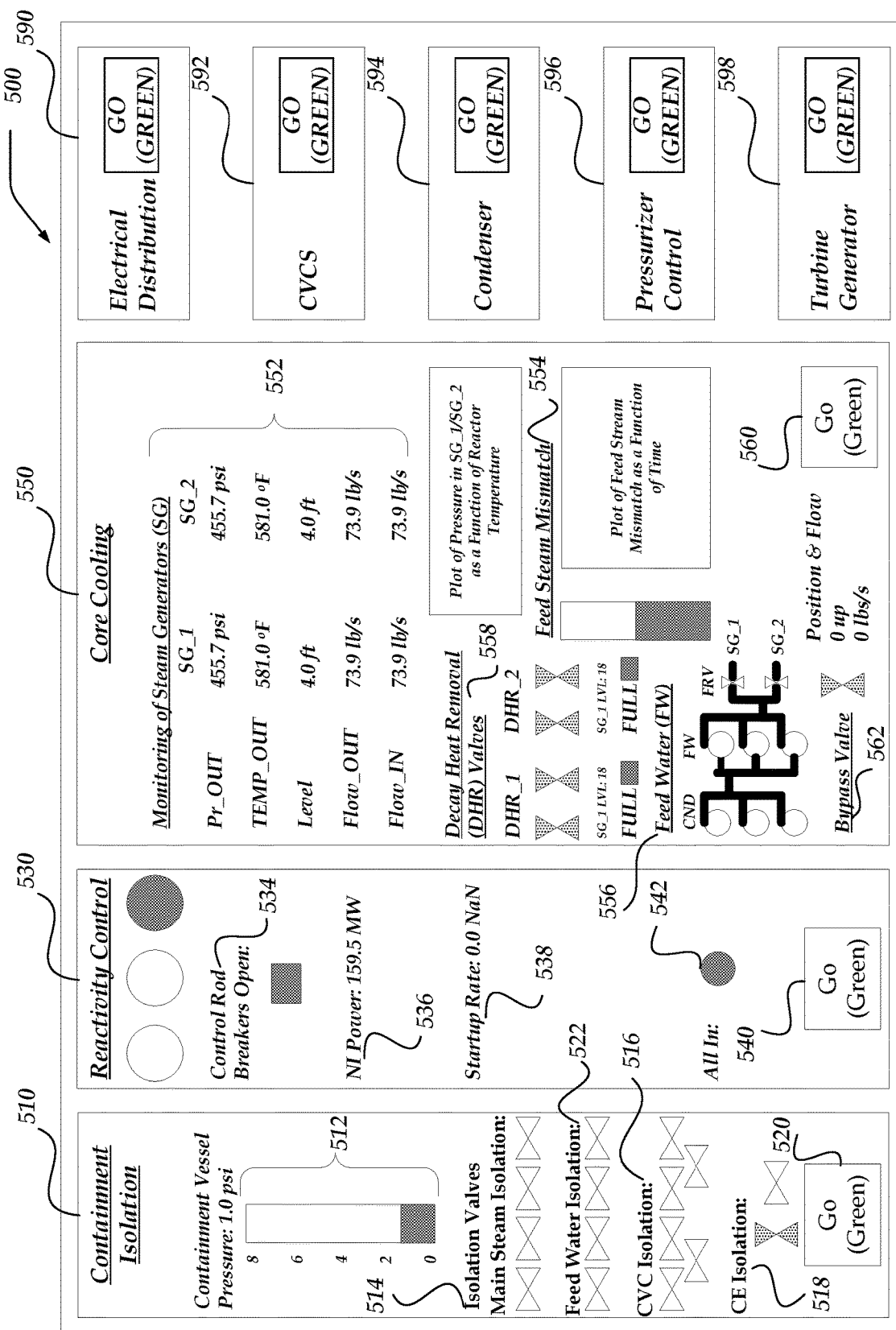
FIG. 5A shows an user interface employed to monitor a power-generation module assembly after a power-generation module shutdown event, in accordance with at least one of the various embodiments.
Figure 5B:
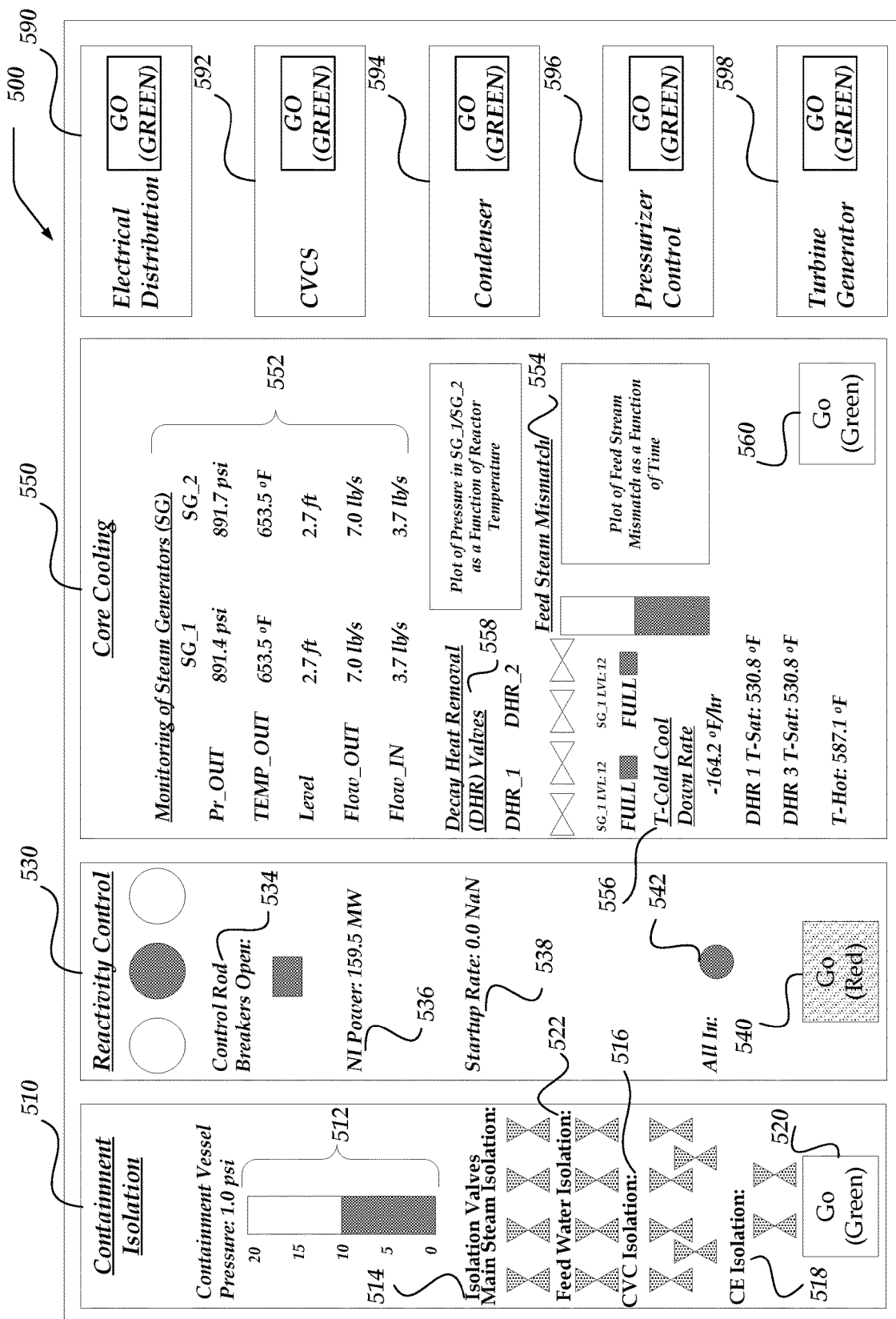
FIG. 5B shows the user interface of FIG. 5A providing a user alert to a user.
Figure 5C:
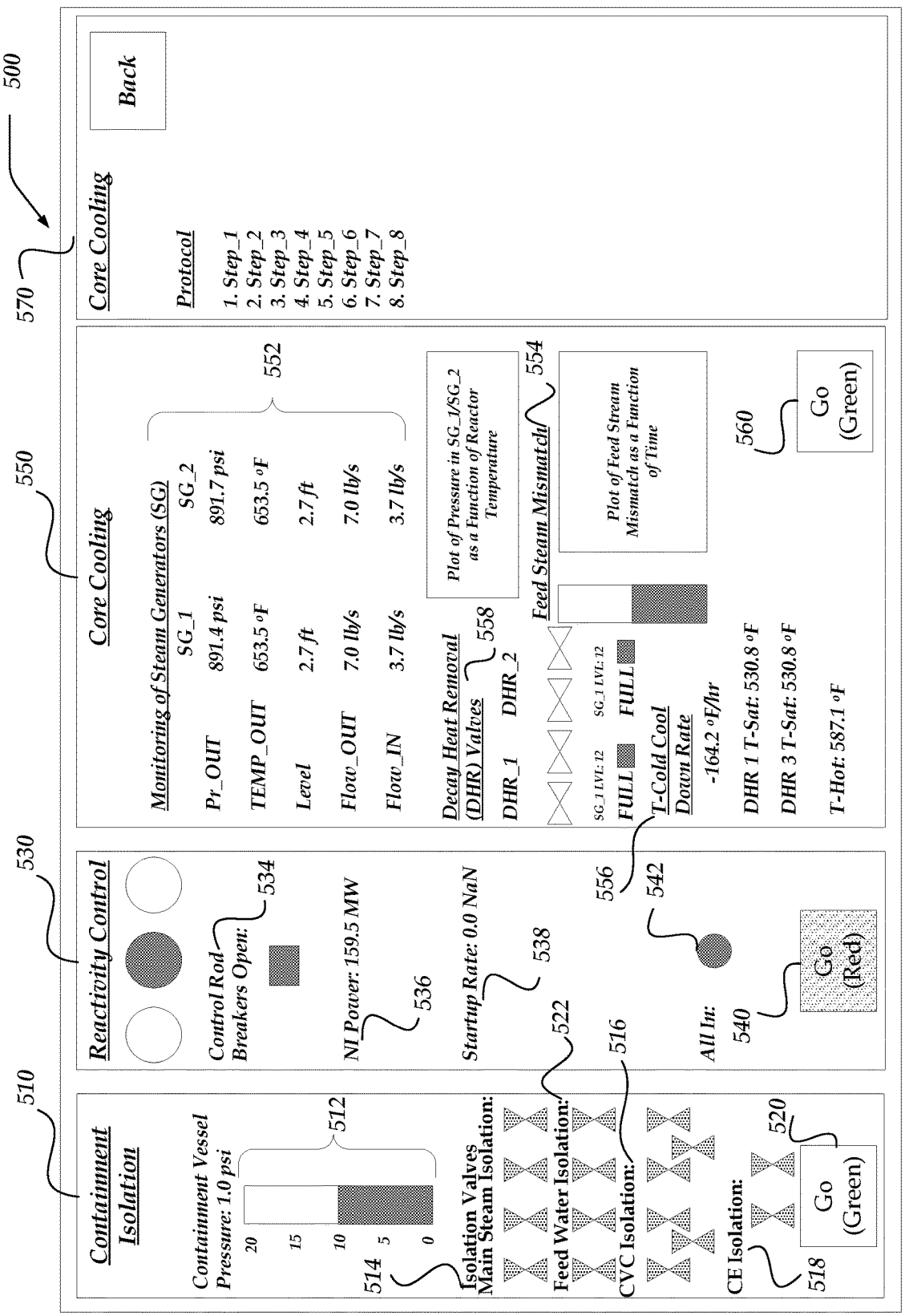
FIG. 5C shows the user interface of FIG. 5A providing a user alert and a protocol to a user.

The discussion in conjunction with processes 300, 400, 420, and 440 additionally refers to user interface (UI) 500 of FIGS. 5A-5C. FIG. 5A shows the UI 500 that is employed to monitor a power-generation module (PGM) assembly, such as but not limited to PGM assembly 100 of FIG. 1A, after a PGM shutdown event, in accordance with at least one of the various embodiments. FIG. 5B shows UI 500 of FIG. 5A providing a user alert to a user. FIG. 5C shows UI 500 of FIG. 5A providing a user alert and a protocol to the user.

As discussed herein, UI 500 is employed in conjunction with the operation of a power plant, such as but not limited to modular power plant 150 of FIG. 1B. In some embodiments, a separate UI, such as but not limited to UI 500, is employed to monitor at least a portion of PGM parameters associated with each of the PGM assemblies, such as but not limited PGM assembly 100 of FIG. 1A or PGM assembly 164 of FIG. 1B, included in a PGM assembly array, such as but not limited to PGM assembly array 156 of modular power plant 150, after the PGM assembly has been shut down. In such embodiments, a separate UI for each PGM assembly may be provided to a separate display device included in a display device array, such as but not limited to display device array 174 of modular power plant 150, included in a control room, such as but not limited to control room 170 of modular power plant 150.

In various embodiments, an event that results in a shutdown of the operation of one or more PGM assemblies may be interchangeably referred to as trip event or a scram event. Accordingly, the various embodiments of UIs discussed herein may monitor PGM parameters post or after a PGM assembly trip or scram.

Figure 3:
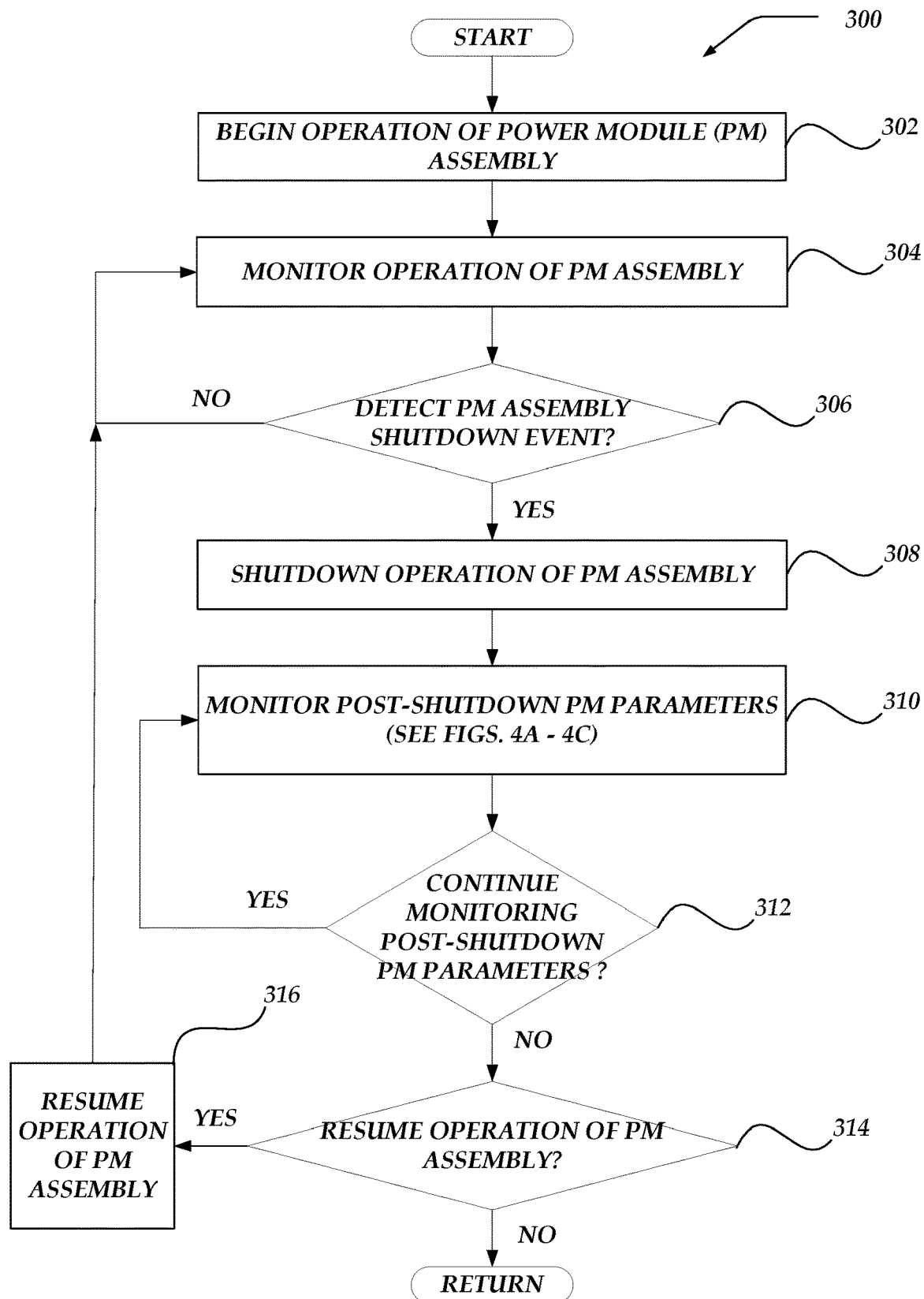
FIG. 3 shows an overview flowchart for a process to operate a modular power plant, in accordance with at least one of the various embodiments.

FIG. 3 shows an overview flowchart for a process to operate a modular power plant, in accordance with at least one of the various embodiments. After a start block, process 300 begins at block 302, where the operation of at least one power-generation module (PGM) assembly is begun. The operation of at least one or more of the PGM assemblies included in PGM assembly array 156 of power plant 150 of FIG. 1B may begin at block 302. In at least one embodiment, a PGM core, such as but not limited to PGM core 102 of PGM assembly 100 of FIG. 1 may begin and/or continue to generate heat at block 302. For instance, control rod drives 132 may position control rods 130 outside of PGM core 102 at block 302.

At block 304, the operation of the PGM assembly is monitored. Monitoring the operation of the PGM assembly may include monitoring at least a portion of the sensor data, provided via diagnostics sensors included in the PGM assembly, such as but not limited to diagnostic sensors 140 of PGM assembly 100.

At decision block 306, it is determined whether a PGM assembly shutdown event is detected. In some embodiments, a PGM assembly scram, or trip, event may be detected at block 306. For instance, a PGM assembly shutdown event may be detected when the operation of the PGM assembly falls outside the bounds of safe operation, or it is otherwise desired to shut down the PGM assembly. Detecting a PGM assembly shutdown event may be based on at least the monitoring of the operation of the PGM assembly at block 304. In at least one embodiment, detecting a PGM assembly shutdown event may be based on at least sensor data. If a PGM assembly shutdown event is detected, then process 300 flows to block 308. Otherwise, process 300 flows back to block 304 to continue monitoring the operation of the PGM assembly.

At block 308, the operation of the PGM assembly is shutdown. In some embodiments, the operation of the PGM core is shutdown. In at least one embodiment, the control rods may be positioned within the PGM core via the control rod drives.

At block 310, a plurality of post-shutdown PGM parameters are monitored. The post-shutdown PGM parameters may be monitored after the shutdown event at least because the PGM assembly continues to generate at least one of heat, pressure, or radioactivity after the PGM control rods have been positioned with the PGM core. Accordingly, for at least safety and asset protection concerns, the post-shutdown PGM parameters are at least monitored at block 310.

Figure 4A:
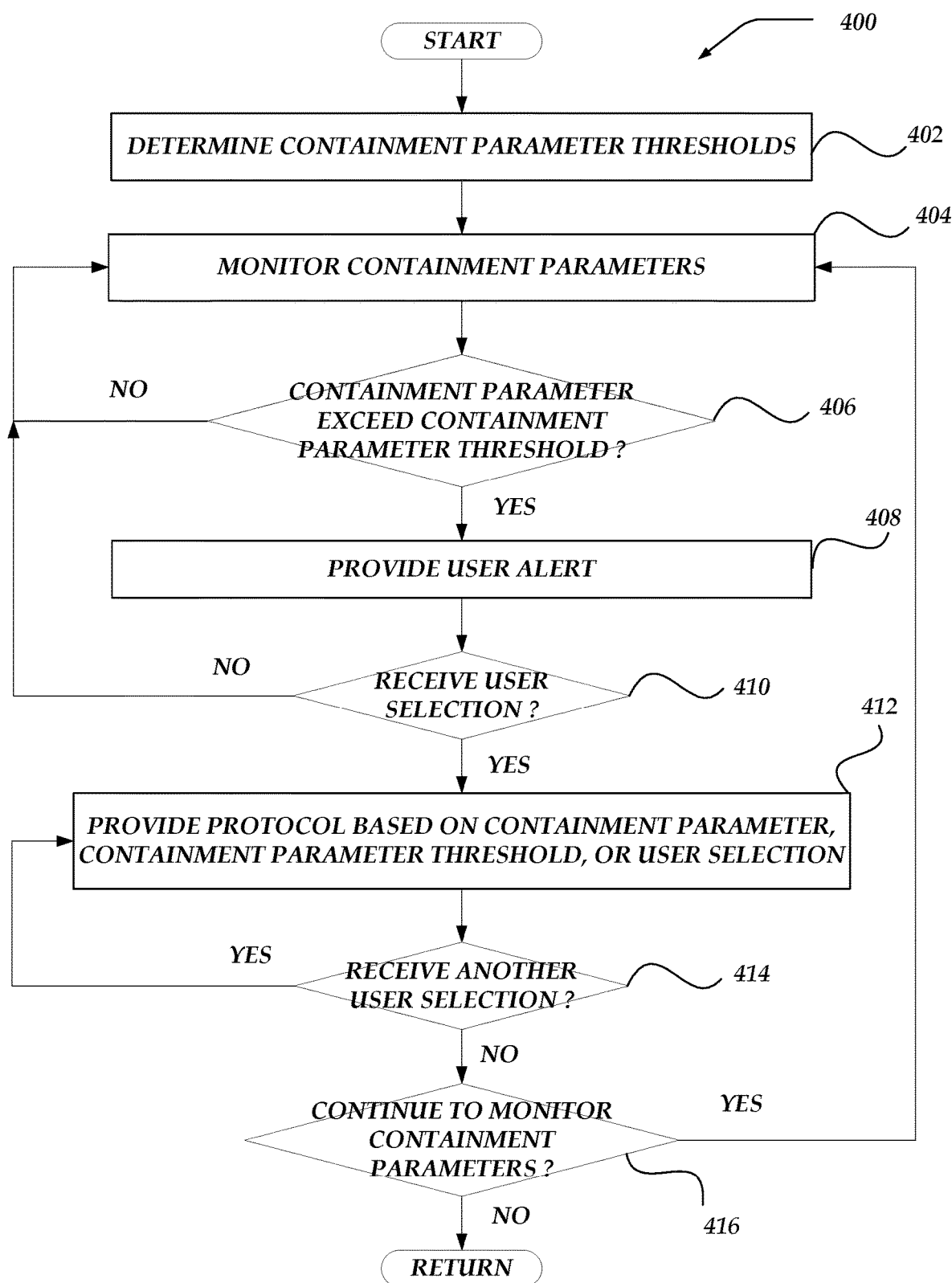
FIG. 4A shows an overview flowchart for a process to monitor post-shutdown power-generation module parameters associated with the containment isolation of a power-generation module assembly, in accordance with at least one of the various embodiments.
Figure 4B:
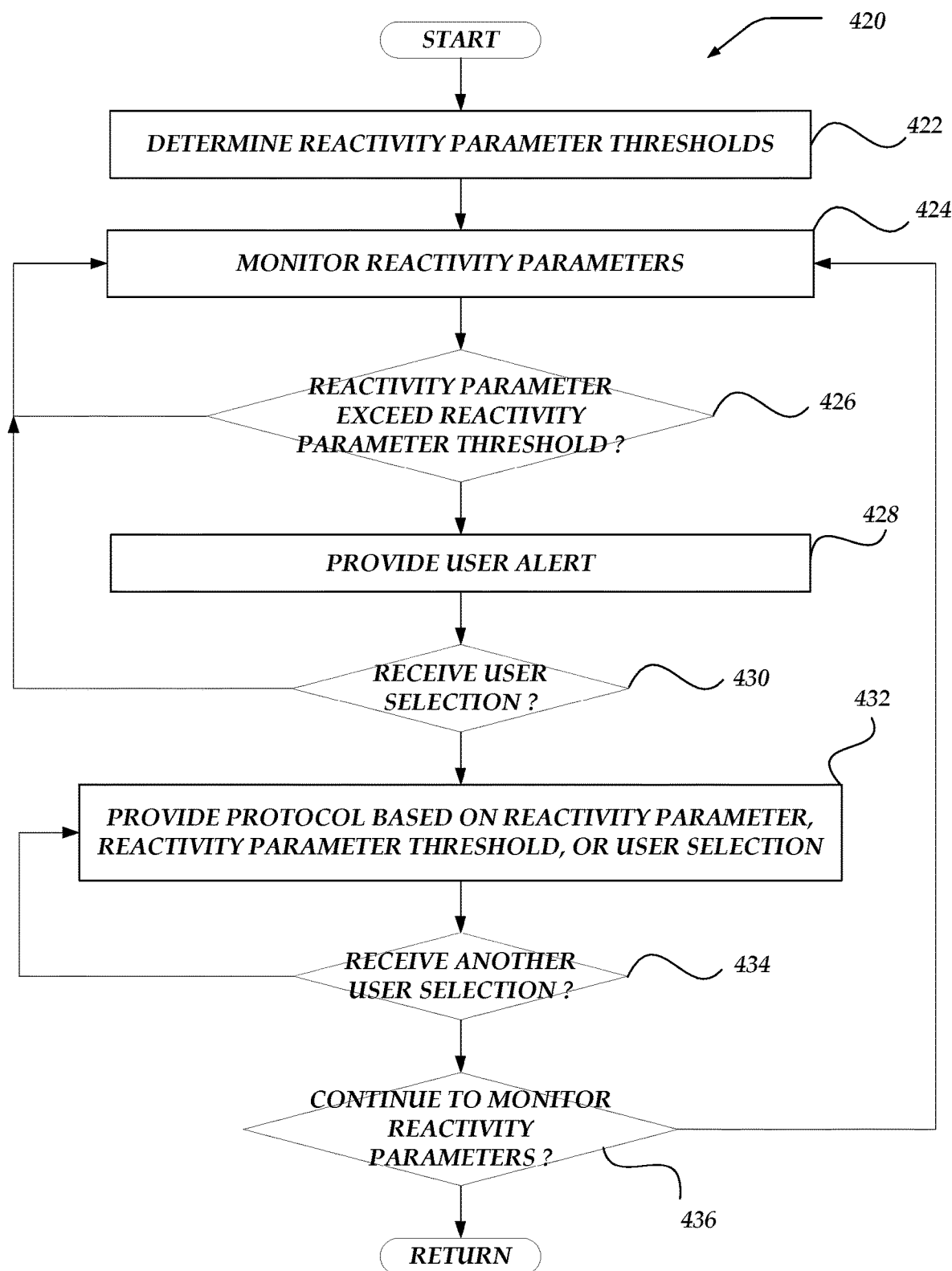
FIG. 4B shows an overview flowchart for a process to monitor post-shutdown power-generation module parameters associated with the reactivity control of a power-generation module assembly, in accordance with at least one of the various embodiments.
Figure 4C:
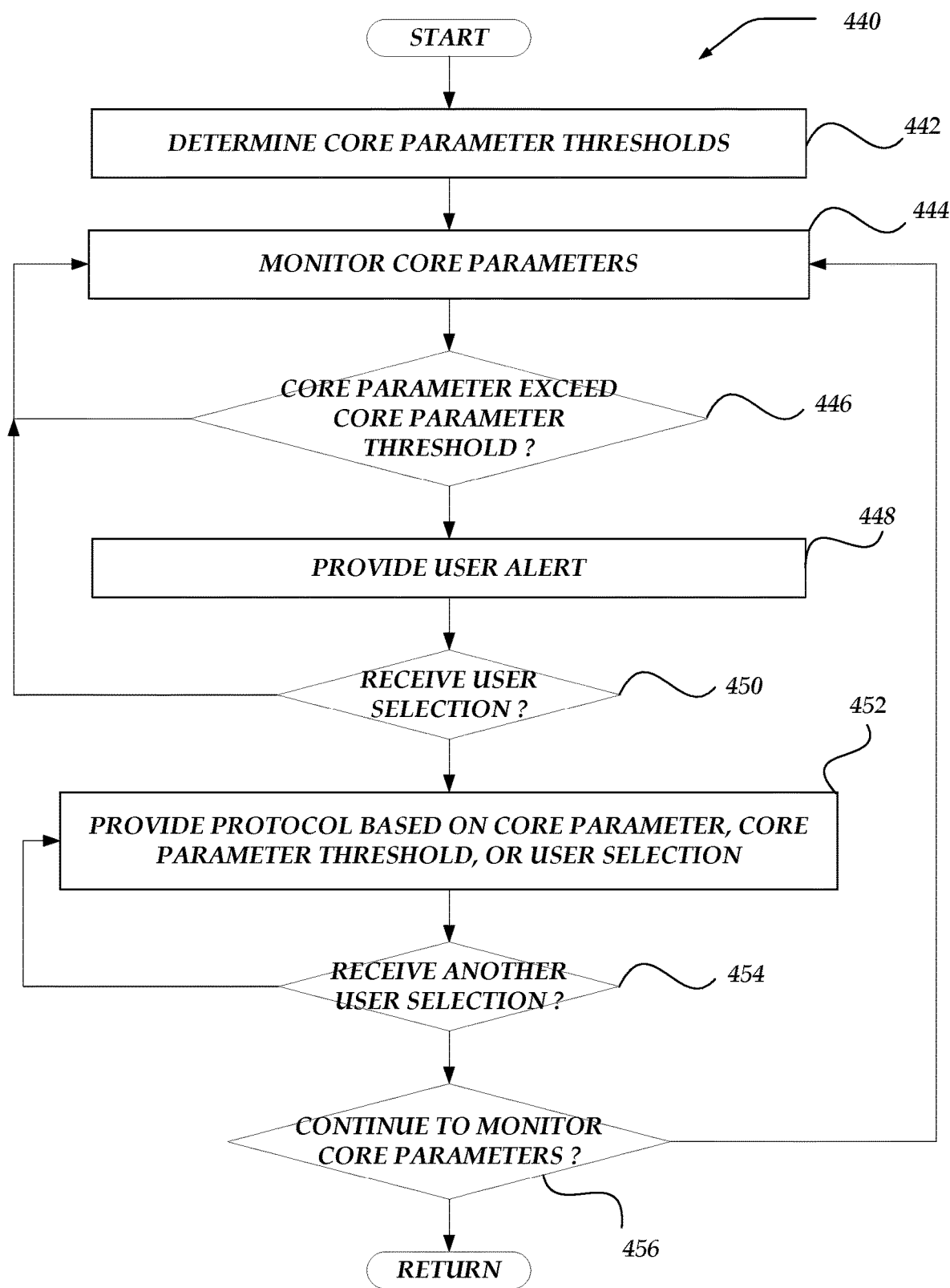
FIG. 4C shows an overview flowchart for a process to monitor post-shutdown power-generation module parameters associated with the core cooling of a power-generation module assembly, in accordance with at least one of the various embodiments.

Various embodiments of monitoring post-shutdown PGM parameters are discussed in at least conjunction with processes 400, 420, and 440 of FIGS. 4A, 4B, and 4C respectively. However briefly, at block 310, a human systems interface (HSI) is provided to a user. In various embodiments, the HSI may include one or more user interfaces (UIs).

As such, the one or more UIs may provide a display that streamlines and/or simplifies the process of monitoring critical and non-critical post-shutdown PGM parameters. A UI may be provided automatically on a display device, such as but not limited to one of the display devices included in display device array 174 of control room 170 of modular power plant 150 of FIGS. 1B-1C. In at least one embodiment, a separate UI corresponding to each of the PGM assemblies included in the PGM assembly array 156 is provided on each of the display devices included in the display device array 174. Each display device that provides a UI corresponds to the corresponding PGM assembly that is monitored in the UI.

The UI may provide information, such as post-shutdown PGM parameters based on at least a portion of the sensor data to a user, such as but not limited to an operator. The operator may be an operator of a modular power plant, of a PGM assembly, of a nuclear reactor, or the like. The UI may provide additional information to the user, such as but not limited to user alerts, based on the sensor data, one or more parameter thresholds, and/or a comparison between the sensor data and the parameter thresholds.

A plurality of display windows within the one or more UIs may provide the user with a visual indication that the PGM assembly is within the safe boundaries of post-shutdown conditions (based on the parameter thresholds). When the PGM assembly is not within the safe boundaries of the post-shutdown conditions, a user alert, such as but not limited to a visual and/or an audio alert, may be provided to the user.

FIGS. 5A-5C show an exemplary embodiment of a UI 500 provided to users during processes 300, 400, 420, and 440 of FIGS. 3-4C respectively. A visual presentation of UI 500 may be based on at least three general categories of post-shutdown PGM parameters: parameters associated with containment isolation, parameters associated with reactivity control, and parameters associated with core cooling. As shown in FIGS. 5A-5C, UI 500 includes a containment isolation window 510, a reactivity control window 530, and a core cooling window 550. Each of windows 510/530/550 displays various status indicators (SI), such as but not limited to values, plots, graphs, charts, tables, status icons, user selections, and the like. Each of the SIs indicates the real-time, or near real-time, status of one or more PGM parameters.

As noted above, when one or more PGM parameters falls outside of a predetermined range (based on PGM parameter thresholds), one or more user alerts may be provided to the user, as shown in FIG. 5B. A user alert may include visual alert, such as a transition of the color of one or more SIs within the UI. For instance, as shown in FIG. 5A, the reactivity control SI 540 may be colored green, as indicated in FIG. 5A, when each of the associated PGM parameters monitored within reactivity control window 530 is within a predetermined parameter range for that PGM parameter.

When one or more of the PGM parameters associated with the reactivity control SI 540 exceeds (or falls below) a corresponding PGM parameter threshold, the color of reactivity control SI 540 may transition, in real-time or close to real-time, to red. As shown in at least FIG. 5B, the visual user alert has been provided to the user by the transition of the color of reactivity control SI 540 to red. In various embodiments, at least an audible user alert, such as but not limited to a siren or an alarm, may accompany such a visual user alert.

At least one of the provided user alerts may indicate that the user is required to take action to address the condition that triggered the user alert. In such embodiments, at least one of the SIs, such as but not limited to reactivity control SI 540 may also be employed to provide the user with a user selection. For instance, at least when reactivity control SI 540 is colored red, reactivity control SU 540 may be selectable by the user via clicking, touching, or some other selecting mechanism.

Upon selection of the one or more user selections, UI 500 may provide the user with one or more protocols to address the triggering conditions and return the PGM assembly to within the acceptable range of PGM parameters. As shown in UI 500 of FIG. 5C, the user has selected the user selection provided via reactivity control SI 540. The right hand side of UI 500 has transitioned to provide a protocol window 570. Based on the selection of user selection via reactivity control SI 540, protocol window 570 provides a protocol that when executed by the user, at least a portion of the associated reactivity parameters may be returned to within the acceptable parameter ranges. Protocol window 570 provides a back button to return UI 500 to a previous state.

In various embodiments, containment isolation SI 520 and core cooling SI 560 may provide similar features, in conjunction with containment isolation window 510 and core cooling window 550 respectively, to that of reactivity control SI 540. The various protocols provided via protocol window 570 may break down multiple criteria for the various associated PGM parameters into several smaller individual components, enabling the user to identify the issue that triggered the user alert and respond in an efficient manner.

At decision block 312, it is determined whether to continue monitoring the post-shutdown PGM parameters. If the PGM parameters are to be continued to be monitored, process 300 returns to block 310. Otherwise, such as when the PGM assembly is ready to resume operation or it is no longer required to monitor the PGM parameters, process 300 flows to decision block 314.

At decision block 314, it is determined whether to resume operation of the PGM assembly. If the operation of PGM assembly is to be resumed, process flows to block 316, where the operation of the PGM assembly is resumed. Process 300 then returns to block 304 to monitor the operation of PGM assembly. Otherwise process 300 may terminate and/or return to a calling process to perform other actions.

FIG. 4A shows an overview flowchart for a process to monitor post-shutdown power-generation module parameters associated with the containment isolation of a power-generation module assembly, in accordance with at least one of the various embodiments. After a start block, process 400 may begin at block 402, where one or more containment parameter thresholds may be determined. The containment parameter thresholds may be determined via an access of a look-up table, a database query, an access to a storage medium, or the like.

Each of the containment parameter thresholds may correspond to one or more post-shutdown power-generation module (PGM) parameters associated with the containment isolation of a PGM assembly, such as but not limited to PGM assembly 100 of FIG. 1A. At least one of the containment parameter thresholds may correspond to an acceptable upper-bound of a post-shutdown PGM parameter, such as but not limited to one or more containment parameters. In some embodiments, at least one of the containment parameter thresholds may correspond to an acceptable lower-bound of a one or more containment parameters. In at least one embodiment, a pair or ordered containment parameter thresholds may correspond to an acceptable range (lower-bound and upper bound) of the one or more corresponding containment parameters.

In some embodiments, at least one of the containment parameter thresholds may indicate an acceptable or preferred configuration, state, or value of one or more containment parameters. For instance, a containment parameter threshold may indicate that a valve associated with or coupled to the containment isolation is either opened or closed in the acceptable or preferred configuration or state.

At block 404, one or more containment parameters are monitored. Monitoring the containment parameters may include monitoring at least a portion of the sensor data, provided via diagnostics sensors included in the PGM assembly, such as but not limited to diagnostic sensors 140 of PGM assembly 100. Monitoring the one or more containment parameters may include providing a user, via a user interface (UI), such as but not limited to UI 500 of FIGS. 5A-5C, status indicators (SI) of the one or more containment parameters. At least a portion of the SIs may be displayed in a containment isolation window, such as but not limited to containment isolation window 510 of UI 500.

In various embodiments, the containment parameters may include at least a pressure within a containment vessel of the PGM assembly, such as containment vessel 106 of FIG. 1A. The containment vessel pressure may be provided by a pressure sensor included in the containment vessel. In an exemplary embodiment, pressure SI 512 of containment isolation window 510 provides the real-time, or near real-time status of the containment vessel pressure.

Main steam SI 514 provides indicators for the status of one or more steam isolation valves, such as but not limited to steam isolation valves 114 of FIG. 1A. Main steam SI 514 may indicate whether each of the one or more steam isolation valves are configured in an open or a closed state. Similarly, feedwater SI 522 indicates the status of one or more feedwater isolation valves, such as but not limited to feedwater isolation valves 112 of FIG. 1A. Likewise CVS SI 516 and CE SI 518 indicates the status of other valves coupled to the containment vessel of the power-generation module.

At decision block 406, it is determined whether one or more containment parameters that are monitored in block 404 exceed (or fall below) one or more corresponding containment parameter thresholds. Such a determination may be based on a comparison between the monitored containment parameter and one or more corresponding containment parameter thresholds. If the containment parameter exceeds (or falls below) the corresponding containment parameter threshold, process 400 flows to block 408. Otherwise, the process 400 flows back to block 404 to continue monitoring the one or more containment parameters.

At block 408, a user alert may be provided to the user. The user alert may be a visual and/or an audible user alert. In one exemplary embodiment, the user alert may include a color transition of at least containment isolation SI 520 of containment isolation window 510.

At decision block 410, it is determined whether a user selection is received. One or more user selections may be provided to the user, via UI 500. The user selections may include selectable buttons, fields, or the like that may be selected via a click, a touch sensitive screen on the display device, or the like. For instance, containment isolation SI 520 may be a selectable button. If the user selects one or more of the provided user selections, process 400 may proceed to block 412. Otherwise, process 400 returns to block 404 to continue monitoring the containment parameters.

At block 412, one or more protocols may be provided to the user via the UI. The provided protocols may be based on at least one of the containment parameters, the containment parameter thresholds, or the received user selection. In various embodiments, the protocol is directed to enabling the user to return one or more of the containment parameters to within the acceptable range determined by the one or more corresponding containment parameter thresholds.

At decision block 414, it is determined whether another user selection is received. If another user selection is received, process 400 flows back to block 412 to provide another protocol to the user based on at least the other received user selection. Otherwise, process 400 flows to decision block 416.

At decision block 416, it is determined whether to continue to monitor the one or more containment parameters. If it is determined to continue monitoring the containment parameters, process 400 returns to block 404. Otherwise process 400 may terminate and/or return to a calling process to perform other actions.

FIG. 4B shows an overview flowchart for a process to monitor post-shutdown power-generation module parameters associated with the reactivity control of a power-generation module assembly, in accordance with at least one of the various embodiments. After a start block, process 420 may begin at block 422, where one or more reactivity parameter thresholds may be determined. The reactivity parameter thresholds may be determined via an access of a look-up table, a database query, an access to a storage medium, or the like.

Each of the reactivity parameter thresholds may correspond to one or more post-shutdown power-generation module (PGM) parameters associated with the reactivity control of a PGM assembly, such as but not limited to PGM assembly 100 of FIG. 1A. At least one of the reactivity parameter thresholds may correspond to an acceptable upper-bound of a post-shutdown PGM parameter, such as but not limited to one or more reactivity parameters. In some embodiments, at least one of the reactivity parameter thresholds may correspond to an acceptable lower-bound of a one or more reactivity parameters. In at least one embodiment, a pair or ordered reactivity parameter thresholds may correspond to an acceptable range (lower-bound and upper bound) of the one or more corresponding reactivity parameters.

In some embodiments, at least one of the reactivity parameter thresholds may indicate an acceptable or preferred configuration, state, or value of one or more reactivity parameters. For instance, a reactivity parameter threshold may indicate that a valve associated with a PGM core of the PGM assembly is either opened or closed in the acceptable or preferred configuration or state.

At block 424, one or more reactivity parameters are monitored. Monitoring the reactivity parameters may include monitoring at least a portion of the sensor data, provided via diagnostics sensors included in the PGM assembly, such as but not limited to diagnostic sensors 140 of PGM assembly 100. Monitoring the one or more reactivity parameters may include providing a user, via a user interface (UI), such as but not limited to UI 500 of FIGS. 5A-5C, status indicators (SI) of the one or more reactivity parameters. At least a portion of the SIs may be displayed in a reactivity control window, such as but not limited to reactivity control window 530 of UI 500.

In various embodiments, one or more of the reactivity parameters may be associated with a radioactivity of a PGM core of the PGM assembly, such as but not limited to a nuclear reactor core. The reactivity parameters may include at least a status for one or more circuit breakers for control rod drives, such but not limited to control rod drives 132 of FIG. 1A. In an exemplary embodiment, breaker SI 534 of reactivity control window 530 provides the real-time, or near real-time status of the configuration of the one or more control rod drives.

Other SIs included in reactivity control window 530, such as but not limited to power SI 536, startup SI 538, and control rod position SI 542 provide the real-time, or near real-time status of other reactivity parameters.

At decision block 426, it is determined whether one or more reactivity parameters that are monitored in block 424 exceed (or fall below) one or more corresponding reactivity parameter thresholds. Such a determination may be based on a comparison between the monitored reactivity parameter and one or more corresponding reactivity parameter thresholds. If the reactivity parameter exceeds (or falls below) the corresponding reactivity parameter threshold, process 420 flows to block 428. Otherwise, the process 420 flows back to block 424 to continue monitoring the one or more reactivity parameters.

At block 428, a user alert may be provided to the user. The user alert may be a visual and/or an audible user alert. In one exemplary embodiment, the user alert may include a color transition of at least reactivity control SI 540 of reactivity control window 530.

At decision block 430, it is determined whether a user selection is received. One or more user selections may be provided to the user, via UI 500. The user selections may include selectable buttons, fields, or the like that may be selected via a click, a touch sensitive screen on the display device, or the like. For instance, reactivity control SI 540 may be a selectable button. If the user selects one or more of the provided user selections, process 420 may proceed to block 432. Otherwise, process 420 returns to block 424 to continue monitoring the reactivity parameters.

At block 432, one or more protocols may be provided to the user via the UI. The provided protocols may be based on at least one of the reactivity parameters, the reactivity parameter thresholds, or the received user selection. In various embodiments, the protocol is directed to enabling the user to return one or more of the reactivity parameters to within the acceptable range determined by the one or more corresponding reactivity parameter thresholds.

In an exemplary embodiment, the right hand side of UI 500 of FIG. 5C includes a protocol window 570. Based on the selection of user selection via reactivity control SI 540, al block 430, protocol window 570 provides a protocol that when executed by the user, at least a portion of the associated reactivity parameters may be returned to within the acceptable parameter ranges. Protocol window 570 provides a back button to return UI 500 to a previous state.

At decision block 434, it is determined whether another user selection is received. If another user selection is received, process 420 flows back to block 422 to provide another protocol to the user based on at least the other received user selection. Otherwise, process 420 flows to decision block 436.

At decision block 436, it is determined whether to continue to monitor the one or more reactivity parameters. If it is determined to continue monitoring the reactivity parameters, process 420 returns to block 424. Otherwise process 420 may terminate and/or return to a calling process to perform other actions.

FIG. 4C shows an overview flowchart for a process to monitor post-shutdown power-generation module parameters associated with the core cooling of a power-generation module assembly, in accordance with at least one of the various embodiments. After a start block, process 440 may begin at block 442, where one or more core parameter thresholds may be determined. The core parameter thresholds may be determined via an access of a look-up table, a database query, an access to a storage medium, or the like.

Each of the core parameter thresholds may correspond to one or more post-shutdown power-generation module (PGM) parameters associated with the core cooling of a PGM assembly, such as but not limited to PGM assembly 100 of FIG. 1A. At least one of the core parameter thresholds may correspond to an acceptable upper-bound of a post-shutdown PGM parameter, such as but not limited to one or more core parameters. In some embodiments, at least one of the core parameter thresholds may correspond to an acceptable lower-bound of a one or more core parameters. In at least one embodiment, a pair or ordered core parameter thresholds may correspond to an acceptable range (lower-bound and upper bound) of the one or more corresponding core parameters.

In some embodiments, at least one of the core parameter thresholds may indicate an acceptable or preferred configuration, state, or value of one or more core parameters. For instance, a core parameter threshold may indicate that a valve associated with a decay hear removal system (DHRS) included in the power-generation module is either opened or closed in the acceptable or preferred configuration or state.

At block 444, one or more core parameters are monitored. Monitoring the core parameters may include monitoring at least a portion of the sensor data, provided via diagnostics sensors included in the PGM assembly, such as but not limited to diagnostic sensors 140 of PGM assembly 100. Monitoring the one or more core parameters may include providing a user, via a user interface (UI), such as but not limited to UI 500 of FIGS. 5A-5C, status indicators (SI) of the one or more core parameters. At least a portion of the SIs may be displayed in a core cooling window, such as but not limited to core cooling window 550 of UI 500.

In various embodiments, the core parameters may include at least parameters associated with one or more steam generators included in the PGM assembly, such as steam generators 122 of FIG. 1A. The core parameters may include at least one of a pressure, a temperature, a level, a flow rate in and out of the steam generators, and the like. The pressures, temperatures, flow rates, and the like may be provided by a pressure, temperature, and flow rate sensors included in the PGM assembly. In an exemplary embodiment, steam generator SI 552 of core cooling window 550 provides the real-time, or near real-time status of various pressures, temperatures, levels, flow rates, and the like within the one or more steam generators. Steam generator SI 552 may provide plots of any of the associated containment parameters, including but not limited to plots as a function of time.

Other SIs included in core cooling window 550, such as but not limited to steam mismatch SI 554, feedwater SI 556, decay heat removal (DHR) valves SI 558, and bypass valve SI 562 provide the real-time, or near real-time status of other core parameters. For instance, DHR valves SI 558 provides indicators for the status of one or more DHRS valves, such as but not limited to DHRS valves 116 of FIG. 1A. DHRS valves SI 558 may indicate whether each of the one or more DHR valves are configured in an open or a closed state.

At decision block 446, it is determined whether one or more core parameters that are monitored in block 444 exceed (or fall below) one or more corresponding core parameter thresholds. Such a determination may be based on a comparison between the monitored core parameter and one or more corresponding core parameter thresholds. If the core parameter exceeds (or falls below) the corresponding core parameter threshold, process 440 flows to block 448. Otherwise, the process 440 flows back to block 444 to continue monitoring the one or more core parameters.

At block 448, a user alert may be provided to the user. The user alert may be a visual and/or an audible user alert. In one exemplary embodiment, the user alert may include a color transition of at least core cooling SI 560 of core cooling window 540.

At decision block 450, it is determined whether a user selection is received. One or more user selections may be provided to the user, via UI 500. The user selections may include selectable buttons, fields, or the like that may be selected via a click, a touch sensitive screen on the display device, or the like. For instance, core cooling SI 560 may be a selectable button. If the user selects one or more of the provided user selections, process 440 may proceed to block 452. Otherwise, process 440 returns to block 444 to continue monitoring the core parameters.

At block 452, one or more protocols may be provided to the user via the UI. The provided protocols may be based on at least one of the core parameters, the core parameter thresholds, or the received user selection. In various embodiments, the protocol is directed to enabling the user to return one or more of the core parameters to within the acceptable range determined by the one or more corresponding core parameter thresholds.

At decision block 454, it is determined whether another user selection is received. If another user selection is received, process 440 flows back to block 452 to provide another protocol to the user based on at least the other received user selection. Otherwise, process 440 flows to decision block 456.

At decision block 456, it is determined whether to continue to monitor the one or more core parameters. If it is determined to continue monitoring the core parameters, process 440 returns to block 444. Otherwise process 440 may terminate and/or return to a calling process to perform other actions.

Additionally, the UIs discussed herein, including but not limited to UI 500 may provide other status indicators that are directed towards the protection of assets associated with the power plant. For instance, when not providing a protocol, such as in FIGS. 5A and 5B, UI 500 may include electrical distribution SI 590. The selectable button included in electrical distribution SI 590 may transition from green to red when a condition exists within the power plant that present one or more risk factors to hardware included in the electrical distribution system, such as but not limited to power bus 162 of power plant 150 of FIG. 1B.

When the selectable button is selected by the user, a protocol may be provided to the user, via a protocol window such as protocol window 570 of FIG. 5C, that enables to user to address the issues that are presenting the one or more risk factors to the electrical distribution system. Chemical and volume control system (CVCS) SI 592, condenser SI 594, pressurizer control SI 596, and turbine generator SI 598 of UI may provide similar functionality.

Illustrative Computer Device

Figure 2:
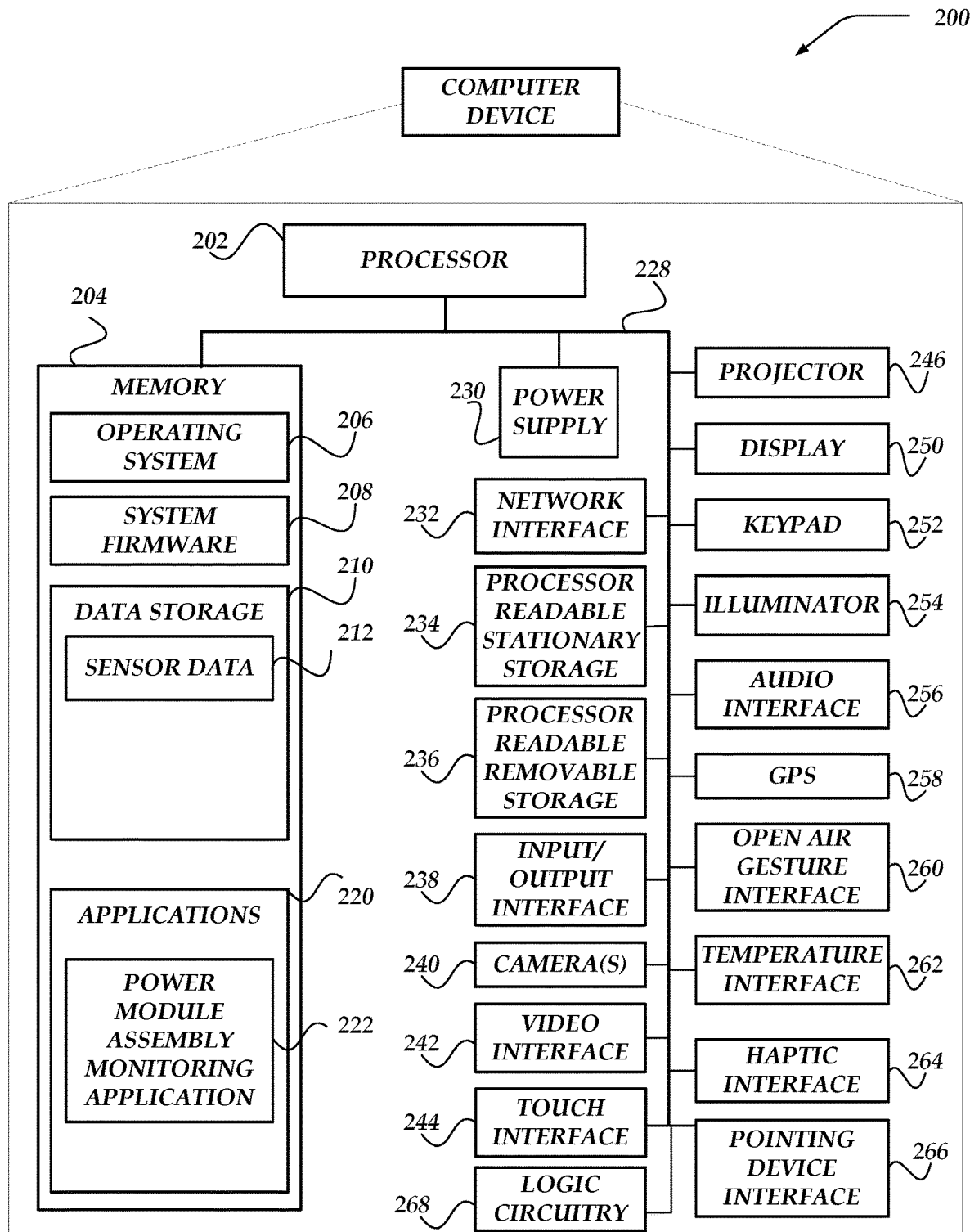
FIG. 2 shows an embodiment of a computer device that may be included in the modular power plant that is shown in FIG. 1B.

FIG. 2 shows one embodiment of computer device 200 that may include many more or less components than those shown. Computer device 200 may represent, for example, at least one embodiment of computer device 172 of FIGS. 1B-1C.

Computer device 200 may include processor 202, such as a central processing unit (CPU), in communication with memory 204 via bus 228. Computer device 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266, or the like. Computer device 200 may optionally communicate with a base station (not shown), or directly with another computer. And in one embodiment, although not shown, an accelerometer or gyroscope may be employed within computer device 200 to measuring and/or maintaining an orientation of computer device 200.

Additionally, in one or more embodiments, the computer device 200 may include logic circuitry 268. Logic circuitry 268 may be an embedded logic hardware device in contrast to or in complement to processor 202. The embedded logic hardware device would directly execute its embedded logic to perform actions, e.g., an Application Specific Integrated Circuit (ASIC), Field Programmable Gate Array (FPGA), and the like.

Also, in one or more embodiments (not shown in the figures), the mobile computer may include a hardware microcontroller instead of a CPU. In at least one embodiment, the microcontroller would directly execute its own embedded logic to perform actions and access its own internal memory and its own external Input and Output Interfaces (e.g., hardware pins and/or wireless transceivers) to perform actions, such as System On a Chip (SOC), and the like.

Power supply 230 may provide power to computer device 200. A rechargeable or non-rechargeable battery may be used to provide power. The power may also be provided by an external power source, such as an AC adapter or a powered docking cradle that supplements and/or recharges the battery.

Network interface 232 includes circuitry for coupling computer device 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of computer device 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Computer device 200 may also comprise input/output interface 238 for communicating with external peripheral devices or other computers such as other mobile computers and network computers. Input/output interface 238 may enable computer device 200 to communicate with one or more other computer devices. In some embodiments, input/output interface 238 may enable computer device 200 to connect and communicate with one or more network computers. Other peripheral devices that computer device 200 may communicate with may include remote speakers (to provide user alerts) and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a computer device 200. For example, the haptic interface 264 may be employed to vibrate computer device 200 in a particular way when another user of a computer is calling. Temperature interface 262 may be used to provide a temperature measurement input and/or a temperature changing output to a user of computer device 200. Open air gesture interface 260 may sense physical gestures of a user of computer device 200, for example, by using single or stereo video cameras, radar, a gyroscopic sensor inside a computer held or worn by the user, or the like. Camera 240 may be used to track physical eye movements of a user of computer device 200.

GPS transceiver 258 can determine the physical coordinates of computer device 200 on the surface of the Earth, which typically outputs a location as latitude and longitude values. Physical coordinates of a mobile computer that includes a GPS transceiver may be referred to as geo-location data. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of computer device 200 on the surface of the Earth. It is understood that under different conditions, GPS transceiver 258 can determine a physical location for computer device 200. In at least one embodiment, however, computer device 200 may, through other components, provide other information that may be employed to determine a physical location of the mobile computer, including for example, a Media Access Control (MAC) address, IP address, and the like.

In at least one embodiment, GPS transceiver 258 is employed for localization of the various embodiments discussed herein. For instance, the various embodiments may be localized, via GPS transceiver 258, to customize the linguistics, technical parameters, time zones, configuration parameters, units of measurement, monetary units, and the like based on the location of a user of computer device 200. In a least one embodiment, a localization of at least a portion of any application included in computer device 200 is performed based on at least the geo-location data or other data acquired by GPS transceiver 258 or other sensors included in computer device 200. For instance, time zone parameters, currency type, units, language parameters, and the like are set or otherwise configured in various portions of software included in one or more mobile computers. Furthermore, any process discussed herein, including but not limited to any process discussed in the context of any flowchart described herein, may be localized as such.

Human interface components can be peripheral devices that are physically separate from computer device 200, allowing for remote input and/or output to computer device 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™ Zigbee™ and the like. One non-limiting example of a mobile computer with such peripheral human interface components is a wearable computer, which might include a remote pico projector along with one or more cameras that remotely communicate with a separately located mobile computer to sense a user's gestures toward portions of an image projected by the pico projector onto a reflected surface such as a wall or the user's hand.

A computer device 200 may include a browser application that is configured to receive and to send web pages, web-based messages, graphics, text, multimedia, and the like. Mobile computer's 200 browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

In various embodiments, the browser application may be configured to enable a user to log into an account and/or user interface to access/view content data.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of computer device 200. The memory may also store operating system 206 for controlling the operation of computer device 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by computer device 200 to store, among other things, applications 220 and/or other data. Data storage 210 may store sensor data generated and/or provided by one or more diagnostic sensors, such as but not limited to diagnostic sensors 140 of power-generation module (PGM) assembly 100 of FIG. 1A. Data storage 210 may further include program code, data, algorithms, and the like, for use by a processor, such as processor 202 to execute and perform actions. In one embodiment, at least some of data storage 210 might also be stored on another component of computer device 200, including, but not limited to, non-transitory processor-readable removable storage device 236, processor-readable stationary storage device 234, or even external to the mobile device. Removable storage device 236 may be a USB drive, USB thumb drive, dongle, or the like.

Applications 220 may include computer executable instructions which, when executed by computer device 200, transmit, receive, and/or otherwise process instructions and data. Applications 220 may include PGM assembly monitoring application 222, which may be provide computer executable instructions, which when executed by computer device 200, or another computer device, may enable actions discussed in conjunction with any of the processes discussed herein, including but not limited to processes 300, 400, 420, and 440 of FIGS. 3-4C respectively. Other examples of application programs that may be included in applications 220 include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

So, in some embodiments, computer device 200 may be enabled to employ various embodiments, combinations of embodiments, processes, or parts of processes, as described herein. Moreover, in various embodiments, computer device 200 may be enabled to employ various embodiments described above in conjunction with computer device 172 of FIGS. 1B-1C and/or any of the processes 300, 400, 420, and 420 described in conjunction with FIGS. 3-4C, as well as providing any of the user interfaces described herein, including at least UI 500 of FIGS. 5A-5C.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

The embodiments of the invention in which an exclusive property or privilege is claimed are defined as follows:

1. A nuclear reactor power generation module (PGM) safety monitoring system comprising:
   a plurality of PGMs, each PGM associated with diagnostic monitoring sensors arranged to measure parameters of the respective PGM;
   a plurality of displays, each display associated with a particular PGM;
   a computer system in communication with the diagnostic monitoring sensors of each of the PGMs and in communication with the plurality of displays, the computer system including a non-transitory computer readable storage medium storing instructions that, when executed by at least one processor, cause the at least one processor to perform operations comprising:
      receiving, from the diagnostic monitoring sensors, sensed data representing measured parameters associated with each of the PGMs;
      detecting an event corresponding to a shutdown of a first PGM of the plurality of PGMs; and
      in response to detecting the event corresponding to the shutdown of the first PGM:

parsing sensed data associated with the first PGM into post-shutdown PGM categories, each category representing data related to monitoring a different safety aspect of PGM shutdown; and generating a shutdown monitoring user interface (UI) for display on a first display of the plurality of displays, the first display being associated with the first PGM, wherein the shutdown monitoring UI includes a first window portion and a second window portion, and wherein sensed data associated with a first post-shutdown PGM category is displayed in the first window portion and sensed data associated with a second post-shutdown PGM category is displayed in the second window portion.

2. The system of claim 1, wherein the operations further comprise for each post-shutdown PGM category:

analyzing the sensed data associated with the first PGM to determine whether a PGM parameter related to the safety aspect represented by the respective post-shutdown PGM category is outside of a threshold associated with the parameter; and in response to determining that all of the PGM parameters related to the safety aspect are within respective thresholds, providing a graphical indicator representing a summary status of the sensed data associated with the respective category, the graphical indicator representing that all of the PGM parameters related to the safety aspect are within respective thresholds.

3. The system of claim 1, wherein the operations further comprise for the first post-shutdown PGM category:

analyzing the sensed data associated with the first PGM to determine whether a PGM parameter related to the safety aspect represented by the first post-shutdown PGM category is outside of a threshold associated with the parameter; and in response to determining the PGM parameter related to the safety aspect represented by the first post-shutdown PGM category is outside of a threshold, providing a graphical indicator representing a summary status of the sensed data associated with the first category, the graphical indicator representing that at least one PGM parameter of the first post-shutdown PGM category is outside of a safe range.

4. The system of claim 3, wherein the operations further comprise, providing, for display in a third window portion of the shutdown monitoring UI, a safety protocol associated with correcting the PGM parameter related to the safety aspect represented by the first post-shutdown PGM category.

5. The system of claim 1, wherein the first post-shutdown PGM category is reactivity control.

6. The system of claim 1, wherein the first post-shutdown PGM category is core cooling.

7. The system of claim 1, wherein the first post-shutdown PGM category is containment isolation.

8. The system of claim 1, wherein the shutdown monitoring UI includes a third window portion, wherein the sensed data associated with a third post-shutdown PGM category is displayed in the third window portion.

9. The system of claim 8, wherein the first post-shutdown PGM category is containment isolation, the second post-shutdown PGM category is reactivity control, and the third post-shutdown PGM category is core cooling.

10. A computer-implemented nuclear reactor power generation module (PGM) safety monitoring method executed by one or more processors, the method comprising:

receiving, from diagnostic monitoring sensors associated with each of a plurality of PGMs, sensed data representing measured parameters associated with each of the PGMs;

detecting an event corresponding to a shutdown of a first PGM of the plurality of PGMs; and in response to detecting the event corresponding to the shutdown of the first PGM:

parsing sensed data associated with the first PGM into post-shutdown PGM categories, each category representing data related to monitoring a different safety aspect of PGM shutdown; and generating a shutdown monitoring user interface (UI) for display on a first display of a plurality of displays, the first display being associated with the first PGM, wherein the shutdown monitoring UI includes a first window portion and a second window portion, and wherein sensed data associated with a first post-shutdown PGM category is displayed in the first window portion and sensed data associated with a second post-shutdown PGM category is displayed in the second window portion.

11. The method of claim 10, further comprising for each post-shutdown PGM category:

analyzing the sensed data associated with the first PGM to determine whether a PGM parameter related to the safety aspect represented by the respective post-shutdown PGM category is outside of a threshold associated with the parameter; and in response to determining that all of the PGM parameters related to the safety aspect are within respective thresholds, providing a graphical indicator representing a summary status of the sensed data associated with the respective category, the graphical indicator representing that all of the PGM parameters related to the safety aspect are within respective thresholds.

12. The method of claim 10, further comprising for the first post-shutdown PGM category:

analyzing the sensed data associated with the first PGM to determine whether a PGM parameter related to the safety aspect represented by the first post-shutdown PGM category is outside of a threshold associated with the parameter; and in response to determining the PGM parameter related to the safety aspect represented by the first post-shutdown PGM category is outside of a threshold, providing a graphical indicator representing a summary status of the sensed data associated with first category, the graphical indicator representing that at least one PGM parameter of the first post-shutdown PGM category is outside of a safe range.

13. The method of claim 12, further comprising, providing, for display in a third window portion of the shutdown monitoring UI, a safety protocol associated with correcting the PGM parameter related to the safety aspect represented by the first post-shutdown PGM category.

14. The method of claim 10, wherein the shutdown monitoring UI includes a third window portion, wherein sensed data associated with a third post-shutdown PGM category is displayed in the third window portion.

15. The method of claim 14, wherein the first post-shutdown PGM category is containment isolation, the second post-shutdown PGM category is reactivity control, and the third post-shutdown PGM category is core cooling.

16. A non-transitory computer readable storage medium storing instructions that, when executed by at least one processor, cause the at least one processor to perform operations comprising:
  receiving, from diagnostic monitoring sensors associated with each of a plurality of PGMs, sensed data representing measured parameters associated with each of the PGMs;
  detecting an event corresponding to a shutdown of a first PGM of the plurality of PGMs; and
  in response to detecting the event corresponding to the shutdown of the first PGM:
    parsing sensed data associated with the first PGM into post-shutdown PGM categories, each category representing data related to monitoring a different safety aspect of PGM shutdown; and
    generating a shutdown monitoring user interface (UI) for display on a first display of a plurality of displays, the first display being associated with the first PGM, wherein the shutdown monitoring UI includes a first window portion and a second window portion, and wherein sensed data associated with a first post-shutdown PGM category is displayed in the first window portion and sensed data associated with a second post-shutdown PGM category is displayed in the second window portion.

17. The medium of claim 16, wherein the operations further comprise for each post-shutdown PGM category:
  analyzing the sensed data associated with the first PGM to determine whether a PGM parameter related to the safety aspect represented by the respective post-shutdown PGM category is outside of a threshold associated with the parameter; and
  in response to determining that all of the PGM parameters related to the safety aspect are within respective thresholds, providing a graphical indicator representing a summary status of the sensed data associated with respective category, the graphical indicator representing that all of the PGM parameters related to the safety aspect are within respective thresholds.

18. The medium of claim 16, wherein the operations further comprise for the first post-shutdown PGM category:
  analyzing the sensed data associated with the first PGM to determine whether a PGM parameter related to the safety aspect represented by the first post-shutdown PGM category is outside of a threshold associated with the parameter; and
  in response to determining the PGM parameter related to the safety aspect represented by the first post-shutdown PGM category is outside of a threshold, providing a graphical indicator representing a summary status of the sensed data associated with the first category, the graphical indicator representing that at least one PGM parameter of the first post-shutdown PGM category is outside of a safe range.

19. The medium of claim 16, wherein the shutdown monitoring UI includes a third window portion, wherein sensed data associated with a third post-shutdown PGM category is displayed in the third window portion.

20. The medium of claim 19, wherein the first post-shutdown PGM category is containment isolation, the second post-shutdown PGM category is reactivity control, and the third post-shutdown PGM category is core cooling.

* * * * *

UNITED STATES PATENT AND TRADEMARK OFFICE
CERTIFICATE OF CORRECTION

PATENT NO. : 10,877,453 B2
APPLICATION NO. : 16/267008
DATED : December 29, 2020
INVENTOR(S) : Don Buenaventura et al.

Page 1 of 1

It is certified that error appears in the above-identified patent and that said Letters Patent is hereby corrected as shown below:

In the Specification

In Column 1, Line 47, delete "reactor reactor" and insert -- reactor --, therefor.

In Column 5, Line 19, delete "hear" and insert -- heat --, therefor.

In Column 5, Line 35, delete "of the of the" and insert -- of the --, therefor.

In Column 14, Line 26, delete "hear" and insert -- heat --, therefor.

In Column 18, Line 67, delete "HTMLS," and insert -- HTML5, --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*